United States Patent
Senecal et al.

(10) Patent No.: US 8,010,326 B2
(45) Date of Patent: Aug. 30, 2011

(54) METHOD AND APPARATUS FOR AUTOMATED GRID FORMATION IN MULTI-CELL SYSTEM DYNAMICS MODELS

(75) Inventors: Peter Kelly Senecal, Middleton, WI (US); Eric Douglas Pomraning, Madison, WI (US); Keith Jared Richards, Mount Horeb, WI (US); Tianliang Yang, Madison, WI (US)

(73) Assignees: Caterpillar Inc., Peoria, IL (US); Convergent Thinking LLC, Madison, WI (US)

( * ) Notice: Subject to any disclaimer, the term of this patent is extended or adjusted under 35 U.S.C. 154(b) by 1541 days.

(21) Appl. No.: 11/318,631

(22) Filed: Dec. 28, 2005

(65) Prior Publication Data

US 2007/0150244 A1     Jun. 28, 2007

(51) Int. Cl.
*G06G 7/48* (2006.01)
(52) U.S. Cl. .................................... 703/6; 703/1; 703/9
(58) Field of Classification Search .................. 703/1, 6, 703/9
See application file for complete search history.

(56) References Cited

U.S. PATENT DOCUMENTS

| | | | |
|---|---|---|---|
| 5,877,777 A | 3/1999 | Colwell | |
| 5,946,479 A * | 8/1999 | Sakaguchi et al. | 716/20 |
| 6,271,856 B1 | 8/2001 | Krishnamurthy | |
| 6,356,860 B1 * | 3/2002 | Barnette | 703/2 |
| 6,959,269 B1 * | 10/2005 | Welterlen | 703/8 |
| 2004/0167757 A1 | 8/2004 | Struijs | |
| 2005/0128195 A1 | 6/2005 | Houston et al. | |
| 2005/0182603 A1 | 8/2005 | Freitas et al. | |
| 2005/0246110 A1 | 11/2005 | Van Dam et al. | |
| 2005/0253854 A1 | 11/2005 | Lischinski et al. | |
| 2006/0015306 A1 | 1/2006 | Chow | |
| 2006/0089803 A1 | 4/2006 | Lei et al. | |

(Continued)

FOREIGN PATENT DOCUMENTS

EP     0339272     11/1989

(Continued)

OTHER PUBLICATIONS

Su-Jin Kim et al., "Offset Triangular Mesh Using the Multiple Normal Vectors of a Vertex", 2004, Computer-Aided Design and Applications, vol. 1, pp. 285-291.*

(Continued)

*Primary Examiner* — Jason Proctor
(74) *Attorney, Agent, or Firm* — Finnegan, Henderson, Farabow, Garrett & Dunner LLP

(57) ABSTRACT

Method for forming a fixed geometric grid for a fluid dynamics system multi-cell computer model, the system having one or more surfaces, includes representing the system surfaces by an array of contiguous polygons. The method also includes creating a single model cell that encompasses the entire system and assigning all the surface polygons to the single model cell. The method further includes subdividing at least the portion of the single model cell encompassing the surface polygon array, including subdividing all intersected assigned polygons, using one or more subdividing planes. The method still further includes reassigning the surface polygons to respective subdivided cells resulting from the subdividing step, identifying those subdivided cells having two or more surface polygons from a common system surface, and calculating effective common boundary areas and normal vectors for those cells. The method also includes treating "split" cells and "sliver" cells. Apparatus for automatically forming a fixed geometric grid includes a digital computer programmed with a CFD program having software to implement the disclosed method.

20 Claims, 6 Drawing Sheets

FIG. 1A

U.S. PATENT DOCUMENTS

2006/0271297 A1 11/2006 Repelli et al.
2006/0271888 A1 11/2006 Meuris et al.
2007/0038423 A1 2/2007 Froning et al.

FOREIGN PATENT DOCUMENTS

| EP | 1299463 | 8/2002 |
|---|---|---|
| EP | 1385103 | 1/2004 |
| WO | WO 2004/061723 | 7/2004 |

OTHER PUBLICATIONS

John P. Morrison et al., An Investigation into Applicability of Distributed FPGAs to High-Performance Computing 277-294 (1994) Department of Computer Science, St. Francis Xavier University, Antigonish, Nova Scotia, Canada; Department of Computer Software, University of Aziu-Wakamatsu-Shi, Japan.

Monorchio et al., A Novel Subgridding Scheme Based on a Combination of the Finite Element and Finite-Difference Time-Domain Methods, IEEE Transactions on Antennas and Propagation, vol. 46, No. 9, Sep. 1998.

Verzico, Roberto, "Large Eddy Simulation in Complex Geometric Configurations Using Boundary Body Forces," AIAA Journal, Mar. 2000, pp. 427-433, vol. 38, USA.

Fadlun, E.A. et al., "Combined Immersed-Boundary Finite-Difference Methods for Three-Dimensional Complex Flow Simulations," Journal of Computation Physics, Jun. 10, 2000, pp. 35-60. vol. 161, USA.

Peskin, Charles S., "Flow Patterns Around Heart Valves: A Numerical Method," Journal of Computational Physics, Oct. 10, 1972, pp. 252-271, vol. 10, USA.

Berger et al., "Aspects (and Aspect Ratios) of Cartesian Mesh Methods," Proceedings of the 16$^{th}$ International Conference on Numerical Methods in Fluid Dynamics, to appear in "Lecture Notes in Physics," Jul. 6-10, 1998, pp. 1-12, Arcachon, France.

Charlton, Eric Frederick, "An Octree Solution to Conservation-laws over Arbitrary Regions (OSCAR) with Applications to Aircraft Aerodynamics," Aerospace Engineering and Scientific Computing in The University of Michigan (dissertation), 1997, pp. 1-220, USA.

Richards et al., "Engine Intake Simulations Using an Immersed Boundary Technique," Society of Automotive Engineers, Inc., Unpublished, pp. 1-12, USA.

Richards et al., "On the Use of the Immersed Boundary Method for Engine Modeling," International Multidimensional Engine Modeling Users Group (Meeting), pp. 1-6, Mar. 2003.

\* cited by examiner

METHOD AND APPARATUS FOR AUTOMATED GRID FORMATION IN MULTI-CELL SYSTEM DYNAMICS MODELS

TECHNICAL FIELD

The present disclosure relates generally to a method and apparatus for computer modeling dynamic systems such as fluid dynamic systems. More particularly, the present disclosure relates to a method for automated grid formation in multi-cell system dynamics models, and apparatus for performing the method.

BACKGROUND

Modeling dynamic systems, including fluid dynamic systems, using computers, particularly high-speed digital computers, is a well known and cost efficient way of predicting system performance for both steady thermophysical and transient conditions without having to physically construct and test an actual system. A benefit to computer modeling is that the effect on performance of changes in system structure and composition can be easily assessed, thereby leading to optimization of the system design prior to construction of a commercial prototype.

Known modeling programs generally use a "multi-cell" approach, where the structure to be modeled is divided into a plurality of discrete volume units (cells). Typically, the computer is used to compute thermophysical values of the fraction of the system within each cell, such as mass, momentum, and energy values, as well as associated fluid system design parameters such as density, pressure, velocity, and temperature, by solving the conservation equations governing the transport of thermophysical value units to or from the neighboring cells and/or through cell boundaries. For a fixed geometric system model using Cartesian coordinates, and absent a system boundary, each cell would have six cell neighbors positioned adjacent the six faces of the cube-shaped cell. An example of a computational fluid dynamics ("CFD") modeling program is the MoSES Program available from Convergent Thinking, LLC, Madison, Wis. However, improvements are possible and desirable in existing modeling programs.

For conventional CFD programs the user initially must supply a three-dimensional grid representing the object to be simulated. For these CFD programs, the grid or "mesh" generation is the most user-intensive portion of the modeling process, especially for complex geometries with moving boundaries, where the grid may have to be reformed after each transient time step.

There are two types of boundary fitted grids. The more conventional type of boundary fitted grid morphs the cells near the boundary to conform to the shape of the geometry, e.g., a six-sided cell near a boundary would not necessarily be a perfect cube. The other method is commonly called a "cut-cell" method. In traditional "cut cell" methods boundary cells are cut one or more times to provide a better "fit" with solid surfaces of the fluid system being modeled. The solid surfaces can be represented by an array of triangles fitted to solid surface which are then associated with the individual model cells adjacent the solid surface. In traditional cut-cell methods there are two approaches to handling cells that are cut by multiple surface triangles. In one approach, the surface effects of each triangle are treated separately for each cut-cell. This process can result in longer CFD simulation run times. In the second method, the cuts of multiple triangles are approximated by a single planar cut. In this approach, the original geometry is not accurately represented because information has been lost in the surface approximation.

Cut-cell Cartesian methods can result in two types of problematic cells: "sliver" cells and "split" cells. Sliver cells are boundary cells that have a very small volume compared to the non-boundary cells. Cells with small volumes can require unreasonably small time steps or an unreasonable number of iterations, and therefore more computation, to keep the solution stable.

Split cells also are a problem for logical block structured grids, of which Cartesian is a type. In a Cartesian grid, each cell is shaped as a cube and is assumed to have only one neighbor in the direction of each of its six faces. Each cell has a logical (x, y, z) coordinate and each of its neighbors will differ by exactly one logical step. Much of the simplicity of Cartesian grids is a direct result of this structured connection of cells to their six neighbors. For this system to work properly there must be only one cell at a logical coordinate. If a surface of the fluid system to be modeled cuts a Cartesian cell into two or more parts, this presents a problem in conventional CFD codes because there will be two separated cells at the same location. These two separate cell parts have the same logical coordinates, thus making it impossible for their respective neighbors to locate the appropriate cell part by looking at the logical coordinates alone.

It should be noted that, in some cases, even with user intervention it is not possible to overcome these problems with the more traditional cut-cell approaches. The disclosed method and apparatus are directed to mitigating one or more of the problems set forth above.

SUMMARY OF THE INVENTION

In one aspect, as embodied and broadly described herein, the method for forming a fixed geometric grid for a fluid dynamics system multi-cell computer model, where the system has one or more surfaces, includes representing the system surfaces by an array of contiguous polygons. The method also includes creating a single model cell that encompasses the entire system and assigning all the surface polygons to the single model cell. The system further includes subdividing at least the portion of the single model cell encompassing the surface polygon array, including all intersected assigned polygons, using one or more subdividing planes. The method still further includes reassigning all the surface polygons to respective subdivided cells resulting from the subdividing step, identifying those subdivided cells having two or more surface polygons from a common system surface, and calculating effective common boundary areas and normal vectors for the common surface polygons in the identified cells.

In another aspect, as embodied and broadly described herein, an apparatus for automatically forming a fixed geometric grid for a fluid dynamics system multi-cell computer model, where the system has one or more surfaces, includes a digital computer and a computational fluid dynamics program stored in the computer. The CFD program includes software for receiving a data set representing the system surfaces by an array of contiguous polygons, for creating a single model cell that encompasses the entire system, and for assigning all the surface polygons to the single model cell. The program also includes software for subdividing at least the portion of the single model cell encompassing the surface polygon array, including subdividing all intersected assigned polygons, using one or more subdividing planes. The program further includes software for reassigning all the surface polygons to respective subdivided cells resulting from the subdividing step, identifying those subdivided cells having two or more surface polygons from a common system surface, and calculating effective boundary areas and normal vectors for those identified cells.

DETAILED DESCRIPTION

Figure 1:
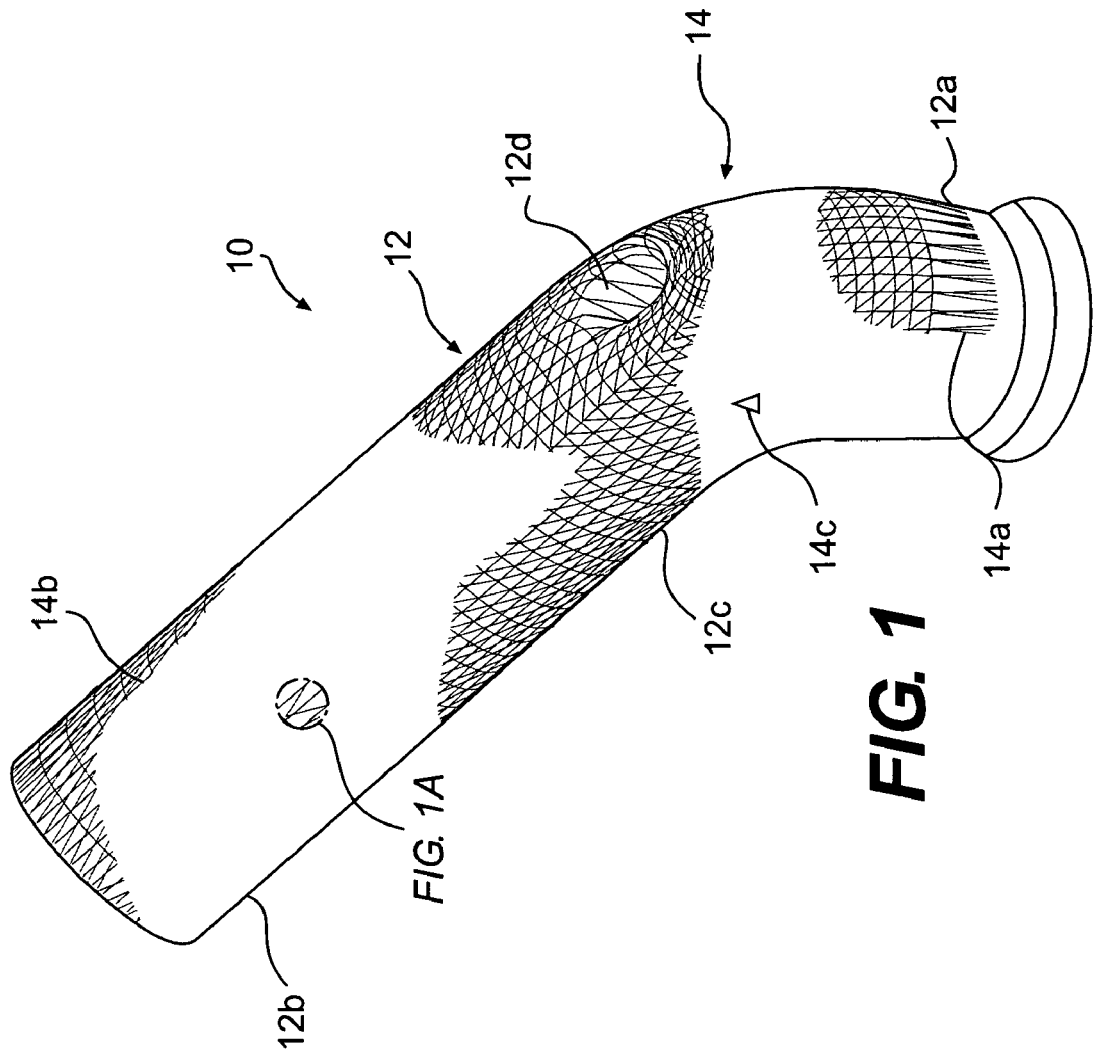
FIG. 1 is a schematic perspective view of a triangulated inner surface of an internal combustion engine header pipe, for use in an exemplary disclosed method for automated grid formation.

In one aspect, a method for forming a fixed geometric grid for a fluid dynamic system multi-cell computer model, where the system has one or more surfaces, includes representing the system surfaces by an array of contiguous polygons. As embodied herein, FIG. 1 depicts a header pipe 10 for an internal combustion engine (not shown), where the surface 12 of pipe 10 is "triangulated" for use in forming a model of pipe 10. That is, each part of surface 12 that serves as a boundary for the fluids (gases, liquids, etc.) is covered by an array of individual triangles 14. However, the present method is not limited to the use of triangle-type polygons to represent the system surface.

The individual triangles of array 14 can be of different sizes, such as triangles 14a and 14b, which are elongated in the relatively straight cylindrical surface sections 12a and 12b of pipe 10, and triangles that are more compact, such as triangles 14c in the curved surface portion 12c of pipe 10. For the presently disclosed method, the entire surface must be closed, and each polygon must share a side with only one other polygon, such as the triangle-type polygons of FIG. 1.

Figure 1A:
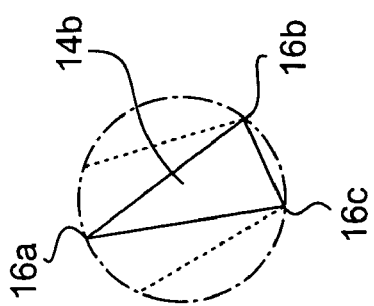
FIG. 1A is a detail of the schematic view of FIG. 1.

Each of these triangles can be uniquely identified in 3D space by a data set specifying the coordinates, such as Cartesian coordinates, of the three vertices of each triangle, such as vertices 16a, 16b, and 16c in the triangle 14b shown enlarged in FIG. 1A. Also, for systems that have multiple surfaces, with each surface performing differently in the fluid dynamics system, it may be preferred to establish an identifier (e.g., number) as part of the triangle data set. Generally, such identifiers of "unique" surfaces can be used when applying the boundary conditions during modeling. One skilled in the art would be able to provide such a triangulated surface and identifying data set using known CAD programs such as Pro/Engineer, available from Parametric Technology Corp., Needham, Mass.

Figure 2:
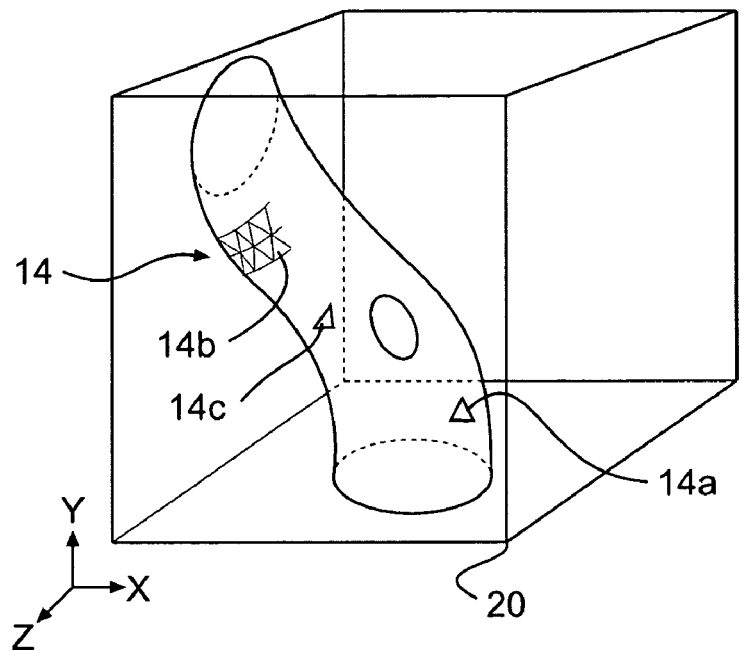
FIG. 2 is a schematic perspective view of a single cell precursor of a grid formed in accordance with the exemplary disclosed method for automated grid formation.

The method further includes creating a single model cell that encompasses the entire flow system to be modeled. As embodied herein, FIG. 2 shows a single Cartesian cell 20 sized to completely encompass the triangulated surface array 14, including, e.g., representative surface triangles 14b, that defines the inner boundary of pipe 10.

Figure 3A:
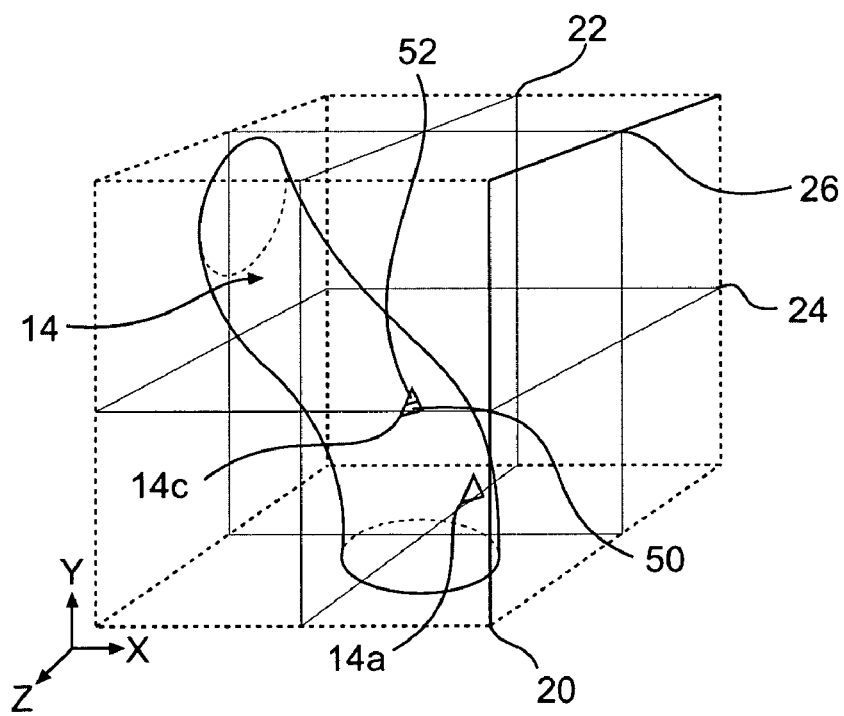
FIG. 3A is a schematic perspective view of the single cell precursor of FIG. 2 being divided by three orthogonal planes, in the exemplary disclosed method for automated grid formation.

The described method further includes assigning all the surface polygons to the single model cell. As embodied herein, and with reference to FIG. 3A, representative surface triangles from array 14 are shown "mapped" into the model grid, which in the first instance comprises the single cell 20 in FIG. 2 as the precursor of the grid to be formed. In effect, the mapped array 14 delineates the closed fluid system, namely pipe 10 in the depicted embodiment, within the grid. The data set representing the grid, which may be an octree data set, will therefore include information on the individual triangles of array 14 corresponding to the surface of pipe 10, for use in further processing to provide the model grid as will be discussed later.

Figure 3B:
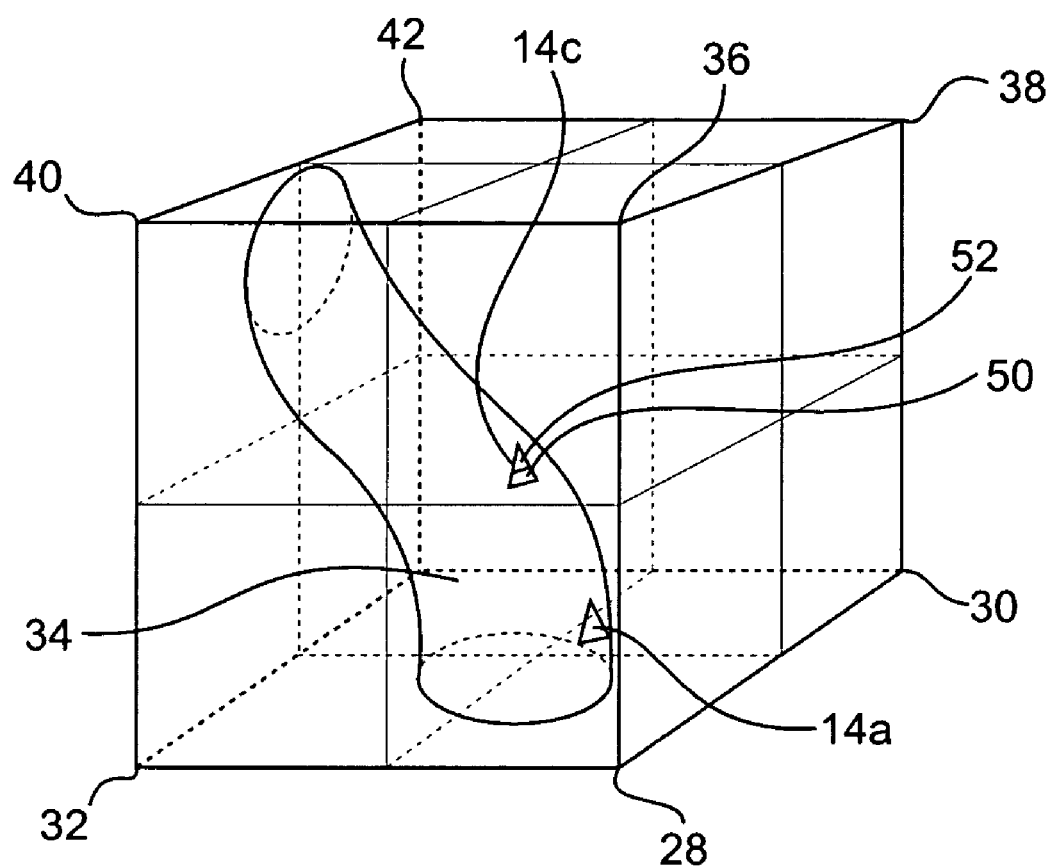
FIG. 3B is a schematic perspective view of the subdivided cells resulting from the action of the dividing planes on the single cell in FIG. 3A, in the exemplary disclosed method for automated grid formation.

Still further, the disclosed method includes subdividing at least the portion of the single model cell encompassing the surface polygon array, including subdividing all intersected assigned polygons, using one or more subdividing planes. As embodied herein, FIGS. 3A and 3B show single cell 20 being divided by three mutually orthogonal planes 22, 24, and 26 to create eight subdivided cells 28, 30, 32, 34, 36, 38, 40, and 42 that have respective portions within the header pipe model volume defined by triangulated surface array 14.

As one skilled in the art would appreciate, the subdividing planes 22, 24, and 26 also divide any surface triangles that are intersected by one or more of the planes, such as representative triangle 14c in FIG. 3A, which is shown being intersected by plane 24 to form surface polygons 50 and 52. These surface polygons may be triangles like polygon 52, or a geometric figure with more than three sides, such as the quadrilateral surface polygon 50.

Further, the described method includes reassigning all the surface polygons, namely the subdivided polygons and any remaining undivided polygons, to respective ones of the subdivided cells resulting from the subdividing step. As embodied herein, the undivided surface triangles, such as representative triangle 14a in FIGS. 3A and 3B, and surface polygons 50 and 52 are "mapped" into the subdivided cells. Specifically, surface triangle 14a in FIG. 3B is mapped into lower right subdivided cell 28. Surface polygon 50 also is mapped into subdivided cell 28, while surface polygon 52 is mapped into upper right subdivided cell 36. The mapping can be accomplished, for example, by accounting for the unique Cartesian (x, y, z) locations of the vertices of each surface triangle and surface polygon relative to the grid in an appropriate data record format, such as an octree format.

Figure 4A:
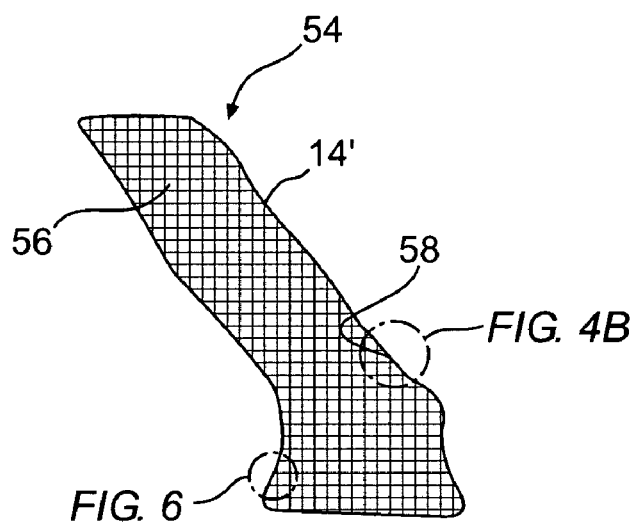
FIG. 4A is a schematic two-dimensional planar cutaway view of the formed grid for modeling the header pipe having an inner surface as shown in FIG. 1, in the exemplary disclosed method for automated grid formation.

It may be preferred that the steps of subdividing and reassigning are repeated until the subdivided cells are equal to, or less than, a desired grid size. For example, FIG. 4A depicts in 2D the resulting grid 54 for the model for header pipe 10 in FIG. 1. Grid 54 is confined within the subdivided, but still closed, contiguous array 14' of surface polygons.

Further modifications to grid 54 may be made, such as embedding cells (not shown) with a finer grid size relative to the average non-boundary cell 56 of grid 54, particularly in system locations having expected large gradients in temperature, pressure, velocity, etc. One skilled in the art would know how to provide such modifications.

Figure 4B:
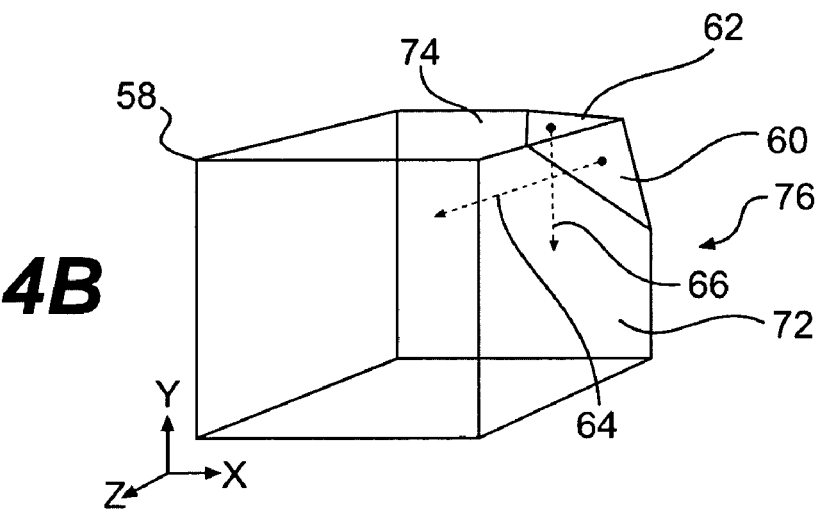
FIG. 4B is a schematic perspective detail view of a boundary cell of the formed grid of FIG. 4A, with assigned surface polygons, in the exemplary disclosed method for automated grid formation.

Still further, the method includes identifying those subdivided cells having two or more surface polygons from a common system surface. As embodied herein, cell 58 in FIGS. 4A and 4B is such a boundary cell having several polygons that originated from surface triangles 14c, which have been subdivided one or more times. For clarity and ease of understanding, only two surface polygons 60 and 62 are depicted in FIG. 4B. In the disclosed embodiment, both can be considered to stem from a common system surface, namely, the portion of the surface 12c of pipe 10 in the vicinity of the bend, but spaced from surface 12d of the port (unnumbered) penetrating pipe 10.

A person skilled in the art using the presently described method would be able to identify such common surfaces based on the expected hydrodynamic and/or thermodynamic effect on the system being modeled. For example, surfaces forming a sharp corner, or relatively moving surfaces, within pipe 10 would not be expected to be "common surfaces." Also, an externally heated or cooled local portion of surface 12 of pipe 10 may or may not be considered a surface in "common" with adjacent unheated/uncooled portions of surface 12, depending on the particular application and test being run.

Still further, the disclosed method includes calculating effective boundary areas and boundary normal vectors for the common surface polygons in the identified cells. As one skilled in the art would understand, treating each separate polygon as a separate boundary in a given cell would require separate computational time (and separate memory if carried out by a digital computer) to apply the appropriate boundary condition for each polygon when solving the transport equations for that cell, during use of the model. By providing a single effective surface area and normal vector for common surface polygons in each cell, such as by the following procedure, both computational time and memory savings can be attained without altering the geometry.

In the finite volume solution of convective transport, the fluxes across the boundaries are summed, along with the side area fluxes, in the following manner:

$$\Delta\phi = \sum_{n=t}^{faces} \phi_n(\vec{u}_n \cdot \vec{n}_n)A_n + \sum_{b=1}^{polygons} \phi_b(\vec{u}_b \cdot \vec{n}_b)A_b$$

For all surface polygons of the same boundary type, $\phi_b$ and $u_b$ are the same. The remaining areas and normal vectors can then be combined by $$\vec{a}_{sum} = \sum_{b=1}^{polygons} \vec{n}_b A_b$$

The $\vec{a}_{sum}$ vector can also be treated as a unit vector, $\vec{n}_{sum}$, with magnitude, $A_{sum}$, equal to the area of the averaged effective boundary as defined by $$A_{sum} = \|\vec{a}_{sum}\|$$

and $$\vec{n}_{sum} = \frac{\vec{a}_{sum}}{A_{sum}}$$

This method of combination allows all of the boundary geometry information for a single cell to be reduced to a single normal vector with a magnitude equal to the projected area of the combined boundaries. This saves on memory and also on computational time because the change in the variable for the cell can now be represented as:

$$\Delta\phi = \sum_{n=t}^{faces} \phi_n(\vec{u}_n \cdot \vec{n}_n)A_n + \phi_b(\vec{u}_b \cdot \vec{n}_{sum}),$$

where all "like" or common boundaries are treated as a single boundary. A similar relationship exists for diffusive fluxes and results in the same effective boundary areas and normal vectors.

As embodied herein, the calculating step includes, for each identified cell, calculating normal vectors from each of the common surface polygons where the magnitude of each vector is the area of the respective common surface polygon. As best seen in FIG. 4B, vector 64 is calculated normal (perpendicular) to surface polygon 60 and with a magnitude (length) equal to the area of that polygon. Similarly, vector 66 is calculated normal to surface polygon 62, and has a magnitude equal to the area of polygon 62. The vector approach is highly useful because, in general, the common surface polygons may not be co-planar with each other or with the cubic faces of the grid cells, such as for the polygons representing the curved surface 12 of pipe 10.

The calculating step further includes, for each identified cell, combining all the normal vectors from each of the common surface polygons to a single normal vector with a magnitude equal to the combined projected areas of the surface polygons in the direction of the single normal vector. As embodied herein, a vector sum $\vec{a}_{sum}$ is calculated as discussed above. The vector sum represents the geometric properties of polygons 60 and 62 in FIG. 4B. One skilled in the art would appreciate that the x, y, and z components of $\vec{a}_{sum}$ can be used to apportion the fluxes through an effective boundary area for polygons 60 and 62, which can be added or subtracted to the thermophysical value quantities (e.g., mass, momentum, energy) transported through faces 72 (side), 74 (top), and/or 76 (rear) of cell 58 to or from neighboring cells (not shown).

The presently disclosed method may also advantageously treat model cell types that would cause problems and/or excessive effort in some conventional computational fluid dynamic modeling processes. Specifically, where a thin (relative to a cell width) fluid system solid surface "splits" a cell into two or more parts separated by the surface, traditional cut-cell CFD methods treat the disconnected split cell parts as if they were connected. Such conventional methods can result in very large errors in calculated performance. For example, if the cell part on one side of the surface received an energy (e.g., heat) flux from a neighboring cell in such conventional CFD methods, that flux would be "felt" instantaneously by the other cell parts if the combined cell parts are treated as a whole when solving transport equations for the cell.

Figure 5:
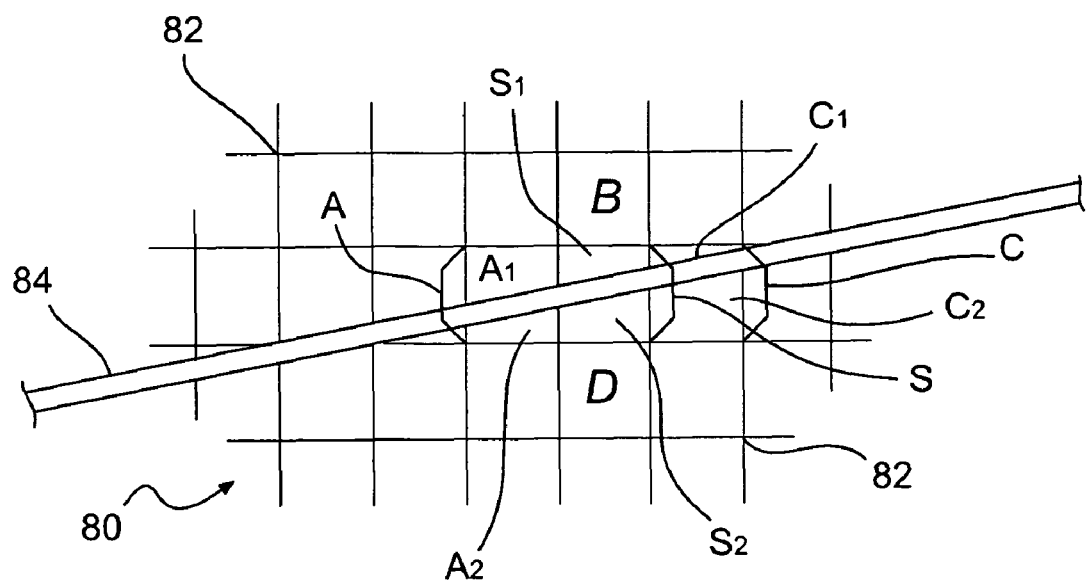
FIG. 5 is a schematic planar detail view of a grid formed to model a duct having a moveable throttle plate wherein the plate surface creates a split boundary cell, in an exemplary disclosed method for automated grid formation.

To avoid such incongruous results, the presently disclosed method may include the step of determining information connecting each cell part of the split cell with respective neighboring boundary cells and non-boundary cells. As embodied herein, FIG. 5 shows (in 2D for ease of description and visualization) a portion of model grid 80 comprised of subdivided cells 82 intersected by thin solid surface 84. Such a surface, for example, could be part of a moveable throttle plate positioned in a duct (both not shown). Cell S is split by surface 84 into two parts S1 and S2. Cell part S1 has as neighbors boundary cell parts A1 and C1, and non-boundary cell B. Cell part S2 has as neighbors boundary cell parts A2 and C2, and non-boundary cell D. In this disclosure, "neighboring" cells are cells that share a common interface area, and boundary cells are cells that have one or more surface triangles or other polygons.

For purposes of calculating fluxes into and out of cell part S1 in the presently disclosed method, transport equations between S1 and A1, C1, and B would be solved, but not between S1 and A2, C2, and D. Similarly, the determined connective information for cell part S2 would provide transport equations being solved with boundary cell parts A2, C2, and non-boundary cell D, but not with parts A1, C1, and cell B. That is, each part of a split cell is treated independently as having its own thermophysical properties.

However, in accordance with the presently disclosed method, both cell parts would retain the same grid location information. That is, during implementation of grid 80 in the FIG. 5 embodiment, both S1 and S2 would have the same grid location as the pre-split cell S. In a similar fashion, A1 and A2 would have the same grid location as pre-split cell A, and C1 and C2 would have the same grid location as pre-split cell C. One skilled in the art would understand that a complex thin surface could split a cell into more than the two parts shown in FIG. 5 and that in a 3D grid, a split cell part may have more neighbors than are depicted for cell parts S1 and S2.

Another model cell type that can cause problems with conventional CFD processes is the so-called "sliver" cell. A sliver cell is a boundary cell having a volume very much smaller than the typical non-boundary cell in the grid. Such extremely small cells can require very small time steps or a large number of iterations to ensure stability during transient or quasi-steady thermophysical calculations using the model, as one skilled in the art would appreciate. Small time steps or large number of iterations in a digital computer implementation of the method can mean very long run-times for CFD methods.

Figure 6:
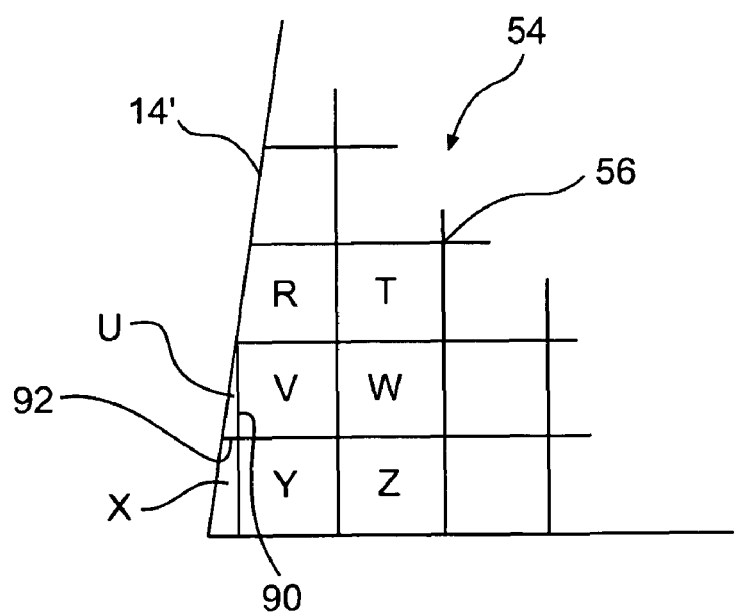
FIG. 6 is a schematic planar cutaway view of a sliver boundary cell in the grid of FIG. 4A, in the exemplary disclosed method for automated grid formation.

In accordance with the present disclosure, the fixed geometric grid forming method includes identifying boundary cells having a volume less than a pre-selected amount, such as a pre-selected fraction of the volume of a non-boundary cell. As embodied herein, FIG. 6 shows a detail of the 2D representation in FIG. 4A of the completed grid 54 for modeling header pipe 10. Subdivided cells T, V, W, Y, and Z, which are not boundary cells as not being bounded by subdivided surface triangle array 14', all have the same volume, namely that corresponding to the final grid size cell 56. However, boundary cells R, U, and X each have a fraction of the cell 56 volume, with cell U having the smallest fraction. For the purpose of the following discussion, it is assumed that cell U has a volume less than a pre-selected minimum desired cell fractional volume, but that both cell X and cell R have fractional volumes greater than a preselected fractional volume.

Further in accordance with the disclosure, the method includes pairing each identified fractional boundary cell with a neighboring cell, and adjusting the geometric information of each paired neighboring cell to include at least the volume and boundary area information of the respective identified fractional boundary cell. As embodied herein, fractional boundary cell U of FIG. 6 would be paired with non-boundary cell V with which it shares a common face 90. However, the paired cell can be a boundary cell. For the purpose of calculating fluxes into and out of cell V, the volume of cell V would be adjusted to include the volume of cell U. Also, the face information of V would be adjusted to include the information of face 92 of cell U in common with boundary cell X. The information regarding common face 90 between cells U and V may be deleted because the transport equations are not solved between cells U and V during performance of the method. However, the separate grid location information for neighboring non-boundary cell V and the identified fractional boundary cell U are retained.

During performance of the method, the transport equations would be solved to determine fluxes into or out of only adjusted cell V of the cell pair (U, V), and the computed specific system design values (e.g., density, temperature, pressure, etc.) of cell V would then be imputed to cell U. One skilled in the art would understand that for the actual 3D grid of FIGS. 4A and 6, cell faces in addition to cell face 92 of cell U would be added to neighboring cell V, namely the cell U faces in common with its neighboring cells in the direction into and out of the 2D plane of FIGS. 4A and 6. Also, more than two cells may be "paired" together.

INDUSTRIAL APPLICABILITY

Figure 7:
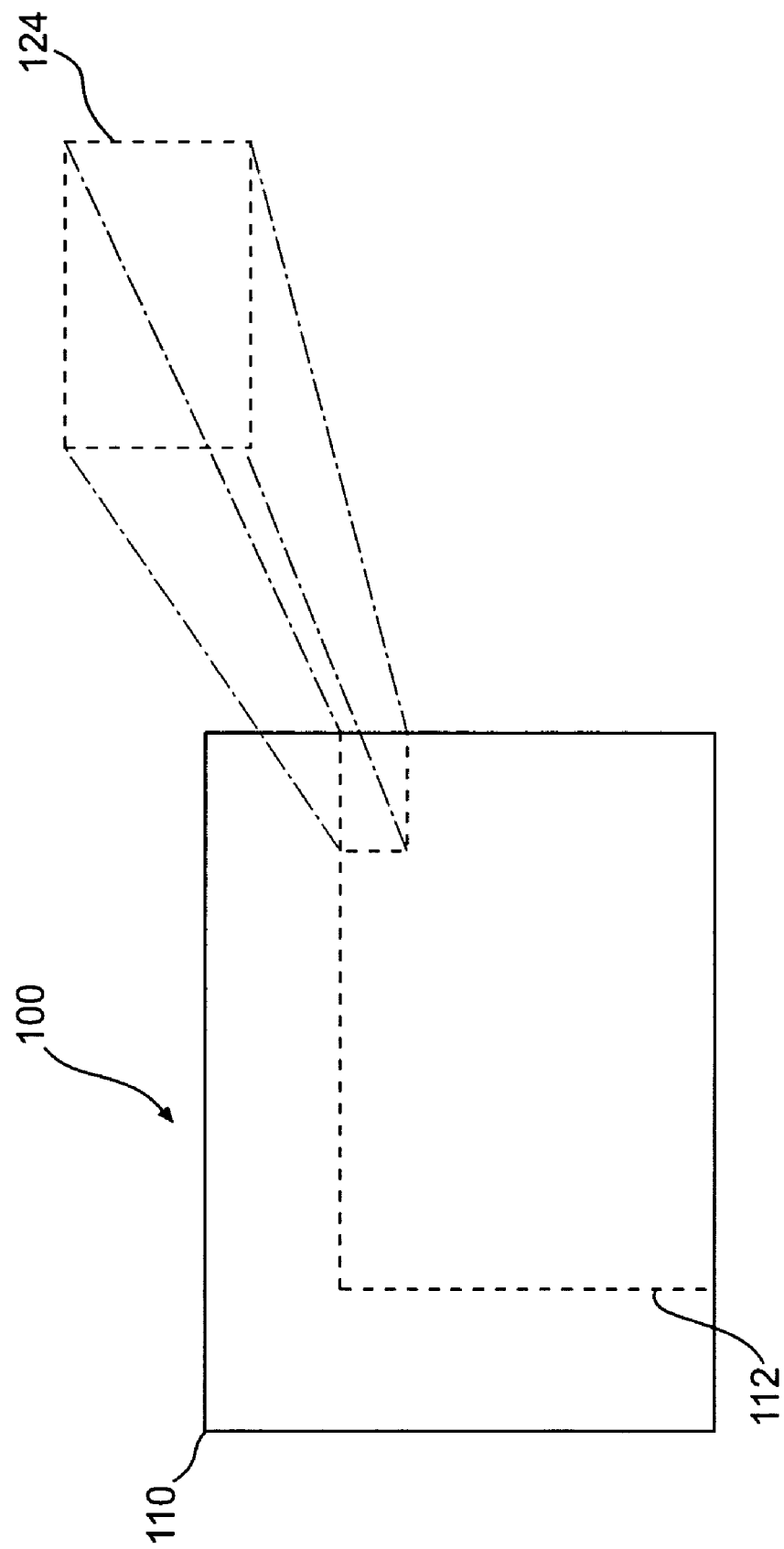
FIG. 7 is a schematic perspective view of an exemplary disclosed apparatus for carrying out the exemplary disclosed method for automated grid formation.

In accordance with another aspect, an apparatus for automatically forming a fixed geometric grid for a fluid dynamics system multi-cell computer model having one or more surfaces includes a digital computer and a computation fluid dynamics program loaded in the computer for running a multi-cell model having a fixed geometric grid. As embodied herein, FIG. 7 schematically depicts apparatus 100 including digital computer 110, such as an AMD "Opteron" computer, programmed with computational fluid dynamics program 112, such as the MoSES program modified to implement the previously described method. Program 112 can be configured to run a 3D multi-cell model of the intake pipe 10 depicted in FIG. 1, as represented by grid 54 in FIG. 4A.

As further embodied herein, program 112 is modified to include program routine 124 having software for implementing the above disclosed method for automated grid formation. While the software in routine 124 could be included in a separate preprocessor program, the automated grid formation method disclosed herein, requiring no manual intervention to change grid orientation, resolution, or surface geometry, can be readily integrated with the MoSES CFD program to facilitate ready access to the method during running of the CFD program, particularly during modeling moving surfaces with fixed geometric grids. Because the grid may be required to be reformed during runtime in such cases, such as is the case with a moving boundary, speed of grid formation may be important for a commercially viable method. The method disclosed herein has been shown to be significantly faster than convention methods.

Specifically, routine 124 includes software for receiving a data set representing the header pipe solid surfaces by an array of contiguous polygons, such as triangle array 14 shown in FIG. 1. Routine 124 further includes software for creating a single model cell that encompasses the entire system, such as cell 20 in FIG. 2. Still further, routine 124 includes software for assigning all the surface polygons to the single model cell, such as representative triangles 14a, 14b, and 14c depicted in FIG. 2.

Still further, routine 124 includes software for subdividing at least the portion of the single model cell encompassing the surface polygon array, including subdividing all intersected assigned polygons, using one or more subdividing planes, such as planes 22, 24, and 26 in FIG. 3A. FIG. 3A also shows surface polygons 50 and 52 formed from the planes intersecting representative cell 14c in FIG. 3A, and FIG. 3B shows the eight cells 28, 30, 32, 34, 36, 38, and 40 subdivided from single cell 20, as discussed previously.

Again, the portions of the subdivided cells interior to the system represented by triangle array 14 are of interest, with the entire cubic structure of the subdivided cells being shown in FIGS. 3A and 3B for ease of visualization.

Routine 124 still further includes software for reassigning all the surface polygons, such as remaining surface triangles, if any, and the surface polygons created by the subdividing process depicted in FIGS. 3A and 3B, to respective subdivided cells. The software also may provide repeated subdividing and reassignment until a desired grid size is achieved, such as grid 54 in FIG. 4A.

Routine 124 yet further includes software for identifying those subdivided cells having two or more surface polygons from a common system surface and calculating effective common boundary areas and normal vectors for such cells. As discussed previously, FIG. 4B shows identified cell 58 with surface polygons 60 and 62 from a common surface of the header pipe 10 of FIG. 1, namely the portion of surface 12c distant from the surface portion 12d represented by surface triangle 14d. When provided with boundary conditions appropriate the specific surface (e.g., heat transfer coefficient for governing heat flux out of cell 58 through the divided polygons 60 and 62), the effective boundary areas and normal vectors calculated as discussed previously will reduce computation time when solving the transport equations for cell 58, relative to conventional CFD codes that would treat surface polygons 60 and 62 separately. One skilled in the art could create or adapt software to provide effective common boundary areas and normal vectors, given the present disclosure.

Furthermore, routine 124 may include software to treat the "sliver" type boundary cells and/or "split" type boundary cells using the methods discussed previously in relation to FIGS. 5 and 6, respectively. Again, one skilled in the art could provide suitable software for routine 124, given the present disclosure.

It may be preferred that the method and apparatus of the present invention be used in conjunction with the Method and Apparatus for Implementing Multi-Grid Computation for Multi-Cell Computer Models with Embedded Cells disclosed in U.S. application Ser. No. 11/318,634 filed concurrently herewith, now U.S. Pat. No. 7,542,890.

It may also be preferred that the method and apparatus of the present invention be used in conjunction with the Method and Apparatus for Treating Moving Boundaries in Multi-Cell Computer Models of Fluid Dynamic Systems disclosed in U.S. application Ser. No. 11/318,633 filed concurrently herewith.

It may still also be preferred that the method and apparatus of the present invention be used in conjunction with the Method and Apparatus for Solving Transport Equations in Multi-Cell Computer Models of Dynamic Systems disclosed in U.S. application Ser. No. 11/318,632 filed concurrently herewith.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. Method for forming a fixed geometric grid for a fluid dynamics system multi-cell computer model configured for use with finite volume transport equations for calculating the flow of one or more of mass, momentum, and energy into and out of each model cell, the system having at least one surface which is entirely closed, the method being executed in a digital computer and comprising the steps of electronically:
representing the system surface by an array of contiguous polygons, wherein each polygon in the surface shares a side with only one other polygon;
creating a single model volumetric cell that encompasses the entire system and is spatially fixed;
assigning all the surface polygons to the single model volumetric cell;
subdividing at least a portion of the single model volumetric cell encompassing the surface polygon array using one or more subdividing planes to provide a fixed grid having a plurality of subdivided volumetric cells, wherein said one or more subdividing planes also subdivide at least one surface polygon to provide subdivided surface polygon parts;
reassigning all of the surface polygons and said subdivided surface polygon parts to respective ones of the subdivided volumetric cells resulting from the subdividing step;
identifying those subdivided volumetric cells having two or more reassigned surface polygons and polygon parts from the system surface;
calculating effective boundary areas and normal vectors for the reassigned surface polygons and polygon parts of those identified subdivided volumetric cells;
wherein the calculated effective boundary areas and normal vectors are adapted to be used in the simulation of mass, momentum or energy transport for respective subdivided volumetric cells of the multi-cell computer model across one or more of said effective boundary areas.

2. The method as in claim 1, wherein the system surface is a solid surface, and wherein in the representing step the array of contiguous polygons is an array of contiguous triangles.

3. The method as in claim 1, wherein the subdividing and reassigning steps are repeated on the respective resulting subdivided volumetric cells until a preselected grid size is reached.

4. The method as in claim 1, wherein the grid is a fixed Cartesian grid, and wherein the single model volumetric cell is subdivided into eight subdivided cells by three mutually orthogonal subdividing planes.

5. The method as in claim 1, wherein the calculating step includes, for each identified subdivided volumetric cell,
calculating normal vectors from each of the reassigned surface polygons and polygon parts to have a magnitude equal to the area of the respective reassigned surface polygon or polygon part; and
combining the normal vectors to a single normal vector with a magnitude equal to projected areas of the respective reassigned surface polygons and polygon parts in the direction of the single normal vector.

6. The method as in claim 5, further including:
identifying a plurality of said entirely closed system surfaces as unique system surfaces;
providing an identifier for each unique surface; and
associating the identifier with respective surface polygons and polygon parts.

7. The method as in claim 1, wherein one or more subdivided volumetric cells are each split into two or more separate parts by a fluid system surface, wherein the method includes determining a grid location of each of the pre-split volumetric cells, the method further including determining connecting information connecting each volumetric cell part of the split volumetric cell with respective neighboring subdivided cells.

8. The method as in claim 7, wherein each of the split volumetric cell parts is given the same grid location information whereby during use of the formed grid, transport equations can be solved independently for each of the split volumetric cell parts.

9. The method as in claim 1, further including determining geometric information for each of the subdivided volumetric cells, the geometric information including volume, face information, and boundary information identifying fractional boundary volumetric cells from among the subdivided cells, the fractional boundary volumetric cells having a volume less than a preselected volume fraction;

pairing each identified fractional boundary volumetric cell with a neighboring subdivided volumetric cell; and adjusting the geometric information of each paired neighboring subdivided volumetric cell to include at least the volume, face information, and the boundary information of the respective fractional boundary volumetric cell, whereby during use of the formed grid, transport equations governing thermophysical value fluxes into and out of only the adjusted neighboring volumetric cell of each volumetric cell pair can be solved.

10. The method as in claim 9, wherein each of the neighboring subdivided volumetric cell and fractional boundary volumetric cell of each volumetric cell pair also have respective grid location information;

wherein the separate grid location information of the neighboring subdivided volumetric cell and the fractional boundary volumetric cell of each volumetric cell pair are retained; and wherein cell face geometric information in common with the respective paired fractional boundary volumetric cell are deleted from each paired neighboring subdivided volumetric cell.

11. Apparatus for automatically forming a fixed geometric grid for a fluid dynamics system multi-volumetric cell computer model, the system having at least one surface which is an entirely closed surface, the apparatus including:

a digital computer;

a computational fluid dynamics program programmed into the computer for solving for thermophysical value information using finite volume transport equations for calculating the flow of one or more of mass, momentum, and energy into and out of each cell of the multi-volumetric cell model;

wherein the computational fluid dynamics program includes software for automatically (1) receiving a data set representing the system surface by an array of contiguous polygons, wherein each polygon in the surface shares a side with only one other polygon;

(2) creating a single model volumetric cell that encompasses the entire system and is spatially fixed;

(3) assigning all the surface polygons to the single model volumetric cell;

(4) subdividing at least a portion of the single model volumetric cell encompassing the surface polygon array using one or more subdividing planes to provide a fixed grid having a plurality of subdivided volumetric cells, wherein said one or more subdividing planes also subdivide at least one surface polygon to provide subdivided surface polygon parts;

(5) reassigning all of the surface polygons and said subdivided surface polygon parts thereof to respective ones of the subdivided volumetric cells resulting from the subdividing step;

(6) identifying those subdivided volumetric cells having two or more reassigned surface polygons and polygon parts from a common the system surface;

(7) calculating effective boundary areas and normal vectors for the reassigned surface polygons and polygon parts for those identified subdivided volumetric cells; and (8) using the calculated effective boundary areas and normal vectors in the simulation of mass, momentum or energy transport for respective subdivided volumetric cells of the multi-cell computer model across one or more of said effective boundary areas.

12. The apparatus as in claim 11, wherein the program includes software for further subdividing the subdivided volumetric cells until a preselected grid size is reached.

13. The apparatus as in claim 11, wherein the grid is a fixed Cartesian grid, and wherein the one volumetric cell is subdivided into eight subdivided volumetric cells by three mutually orthogonal subdividing planes.

14. The apparatus as in claim 11, wherein the program further includes software for:

computing, for each identified subdivided volumetric cell, normal vectors from each of the reassigned surface polygons and polygon parts, to have a magnitude equal to the area of the respective reassigned surface polygon or polygon parts, and combining the normal vectors to a single normal vector with a magnitude equal to projected areas of the respective reassigned surface polygons and polygon parts in the direction of the single normal vector.

15. The apparatus as in claim 11, wherein one or more subdivided volumetric cells are each split into two or more separate parts by a fluid system surface, the program including software for determining grid location information for the pre-split volumetric cells, the program further including software for determining connecting information connecting each volumetric cell part of the split volumetric cell with respective neighboring subdivided volumetric cells.

16. The apparatus as in claim 15, wherein the program software gives each of the volumetric cells parts from the split volumetric cell the same pre-split grid location information; and wherein the program software solves transport equations for each of the split volumetric cell parts independently.

17. The apparatus as in claim 11, wherein the program further includes software for:

determining geometric information for each of the subdivided volumetric cells, the geometric information including volume, face information, and boundary information;

identifying fractional boundary volumetric cells from among the subdivided volumetric cells, the fractional boundary volumetric cells having a volume less than a preselected volume fraction;

pairing each fractional boundary volumetric cell with a neighboring subdivided volumetric cell; and adjusting at least the volume information, face information, and boundary information of each paired neighboring subdivided volumetric cell to include the corresponding information of the respective fractional boundary volumetric cell, wherein during running of the computational fluid dynamic program with the system model using the formed grid, transport equations governing thermophysical value fluxes into and out of only the adjusted neighboring subdivided volumetric cell of each volumetric cell pair are solved.

18. The apparatus as in claim 17, wherein the program also includes software for determining grid location information for each subdivided volumetric cell, wherein the grid location information of the neighboring subdivided volumetric cell and the fractional boundary volumetric cell of each volumetric cell pair are retained, and wherein during use of the formed grid, the solved-for thermophysical value information of a respective neighboring subdivided volumetric cell is imputed to the paired fractional boundary volumetric cell by the program software.

19. The apparatus as in claim 17, wherein the program contains software for deleting from each paired neighboring subdivided volumetric cell, volumetric cell face geometric information in common with the respective paired fractional boundary volumetric cell.

20. The apparatus as in claim 11, wherein the system surface is a solid surface, and wherein the array of representative contiguous surface polygons is an array of contiguous triangles.

* * * * *